United States Patent
Park

(10) Patent No.: US 10,853,236 B2
(45) Date of Patent: Dec. 1, 2020

(54) STORAGE DEVICE AND METHOD FOR OPERATING THE SAME

(71) Applicant: SK hynix Inc., Gyeonggi-do (KR)

(72) Inventor: Jong Ju Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 72 days.

(21) Appl. No.: 16/154,358

(22) Filed: Oct. 8, 2018

(65) Prior Publication Data

US 2019/0286555 A1 Sep. 19, 2019

(30) Foreign Application Priority Data

Mar. 19, 2018 (KR) .................. 10-2018-0031751

(51) Int. Cl.
| | |
|---|---|
| *G06F 12/02* | (2006.01) |
| *G06F 12/0871* | (2016.01) |
| *G06F 12/0873* | (2016.01) |
| *G06F 3/06* | (2006.01) |

(52) U.S. Cl.
CPC ........ *G06F 12/0246* (2013.01); *G06F 3/0614* (2013.01); *G06F 3/0649* (2013.01); *G06F 3/0688* (2013.01); *G06F 12/0871* (2013.01); *G06F 12/0873* (2013.01); *G06F 2212/222* (2013.01); *G06F 2212/313* (2013.01); *G06F 2212/7201* (2013.01); *G06F 2212/7202* (2013.01); *G06F 2212/7208* (2013.01)

(58) Field of Classification Search
CPC ...... G06F 3/0614; G06F 3/064; G06F 3/0646; G06F 3/0647; G06F 3/0649; G06F 3/0688; G06F 12/0246; G06F 12/0614; G06F 12/0607; G06F 12/0646; G06F 12/0871; G06F 12/0873; G06F 2212/1024; G06F 2212/222; G06F 2212/313; G06F 2212/7201; G06F 2212/7202; G06F 2212/7208
USPC .................. 711/118, 121, 157, 165, 168, 169
See application file for complete search history.

(56) References Cited

U.S. PATENT DOCUMENTS

| | | | | |
|---|---|---|---|---|
| 6,272,594 | B1 * | 8/2001 | Gupta ................. | G06F 12/1045 711/127 |
| 8,190,809 | B2 * | 5/2012 | Hutson ............... | G06F 12/0607 711/157 |
| 2005/0278491 | A1 * | 12/2005 | Aakjer ................ | G06F 12/0607 711/157 |

FOREIGN PATENT DOCUMENTS

KR 1020090017238 2/2009

* cited by examiner

*Primary Examiner* — Gary J Portka
(74) *Attorney, Agent, or Firm* — IP & T Group LLP

(57) ABSTRACT

A storage device and a method of operating the storage device include various memory devices. The storage device includes a plurality of memory devices each including at least one or more read cache memory blocks and a plurality of main memory blocks; and a memory controller configured to spread and store data stored in an identical memory device, having a read count representing a number of read requests and exceeding a threshold value, among data stored in the plurality of main memory blocks, to the at least one or more read cache memory blocks included in each of the plurality of memory devices.

15 Claims, 16 Drawing Sheets

STORAGE DEVICE AND METHOD FOR OPERATING THE SAME

CROSS-REFERENCE TO RELATED APPLICATION

The present application claims priority under 35 U.S.C. § 119(a) to Korean patent application number 10-2018-0031751, filed on Mar. 19, 2018, the entire disclosure of which is incorporated herein by reference in its entirety.

BACKGROUND

Field of Invention

Various embodiments of the present disclosure generally relate to an electronic device, and more particularly, to a storage device and a method of operating the storage device.

Description of Related Art

Generally, a storage device is a device which stores data under control of a host device such as a computer, a smartphone, or a smartpad. According to the type of device provided to store data, examples of the storage device may be classified into a device such as a hard disk drive (HDD) which stores data in a magnetic disk, and a device such as a solid state drive (SSD) or a memory card which stores data in a semiconductor memory, particularly, a nonvolatile memory.

The storage device may include a memory device in which data is stored, and a memory controller configured to store data to the memory device. The memory device may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc.

SUMMARY

Various embodiments of the present disclosure are directed to a storage device including a read cache memory block, and a method for operating the storage device.

An embodiment of the present disclosure may provide for a storage device comprising: a plurality of memory devices each including at least one or more read cache memory blocks and a plurality of main memory blocks; and a memory controller configured to spread and store data stored in an identical memory device, having a read count representing a number of read requests and exceeding a threshold value, among data stored in the plurality of main memory blocks, to the at least one or more read cache memory blocks included in each of the plurality of memory devices.

An embodiment of the present disclosure may provide for a method for operating a storage device including a plurality of memory devices coupled to an identical channel and each including at least one or more read cache memory blocks and a plurality of main memory blocks, and a memory controller configured to control the plurality of memory devices, the method comprising: detecting data, having a read count representing a number of read requests and exceeding a threshold value, among data stored in the plurality of main memory blocks; and dispersing and storing the data, having the read count that exceeds the threshold value, to the at least one or more read cache memory blocks included in each of the plurality of memory devices, depending on whether the data, having the read count that exceeds the threshold value, is stored in an identical memory device.

An embodiment of the present disclosure may provide for a memory system comprising: a plurality of memory devices each including a read cache memory block and a main memory block; and a controller suitable for: detecting as cache data, data having a greater read count than a threshold among data stored in each main memory block of the memory devices; and spreading, when plural pieces of cache data are detected in one of the memory devices, the plural pieces of cache data into the read cache memory blocks of the memory device such that a subsequent read operation is performed in a data interleaving manner for the spread pieces of cache data.

DETAILED DESCRIPTION

Figure 1:
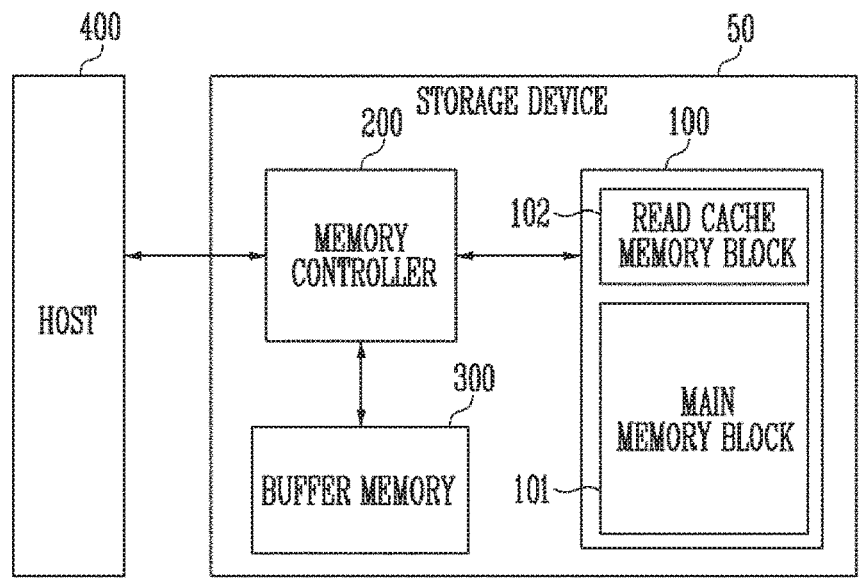
FIG. 1 is a block diagram illustrating a storage device in accordance with an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Hereinafter, embodiments will be described with reference to the accompanying drawings. Embodiments are described herein with reference to cross-sectional illustrations that are schematic illustrations of embodiments and intermediate structures. As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a block diagram illustrating a storage device 50 in accordance with an embodiment of the present disclosure.

Referring to FIG. 1, the storage device 50 may include a memory device 100, a memory controller 200, and a buffer memory 300.

The storage device 50 may be a device configured to store data under control of the host 400 such as a cellular phone, a smartphone, an MP3 player, a laptop computer, a desktop computer, a game machine, a TV, a tablet PC, or an in-vehicle infotainment system.

The memory device 100 may store data therein. The memory device 100 may operate under control of the memory controller 200. The memory device 100 may include a memory cell array including a plurality of memory cells configured to store data therein. The memory cell array may include a plurality of memory blocks. Each memory block may include a plurality of memory cells. Each memory block may include a plurality of pages. In an embodiment, each page may be the unit of storing data to the memory device 100 or reading stored data from the memory device 100. Each memory block may be the unit of erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this specification, the memory device 100 is a NAND flash memory, however other memory devices can be used.

In an embodiment, the memory device 100 may be embodied in a three-dimensional array structure. The present disclosure may be applied not only to a flash memory in which a charge storage layer is formed of a conductive floating gate (FG), but also to a charge trap flash (CTF) memory in which a charge storage layer is formed of an insulating layer.

The plurality of memory blocks included in the memory device 100 may be divided into a main memory block 101 and a read cache memory block 102. In an embodiment, the memory device 100 may include at least one or more main memory blocks 101, and at least one or more read cache memory blocks 102.

In an embodiment, each of the memory cells included in the read cache memory block 102 may be formed of a single-level cell (SLC) capable of storing one data bit. Each of the memory cells included in the main memory block 101 may be formed of a multi-level cell (MLC) capable of storing two data bits, a triple-level cell (TLC) capable of storing three data bits, or a quad-level cell (QLC) capable of storing four data bits.

Data to be stored to the read cache memory block 102 may be cache data. In an embodiment, the cache data may be data of which a read count or the number of data read requests exceeds a threshold value (TH) among data stored in the main memory block 101.

In an embodiment, the memory controller 200 may control a plurality of memory devices 100. In various embodiments, the cache data may be data, a read count of which exceeds a threshold value (TH), among data stored in the same main memory block 101.

The memory device 100 may receive a command and an address from the memory controller 200 and access a region of the memory cell array that is selected by the address. In other words, the memory device 100 may perform an operation corresponding to the command on the region selected by the address. For example, the memory device 100 may perform a write (program) operation, a read operation, and an erase operation. During a program operation, the memory device 100 may program data to a region selected by an address. During a read operation, the memory device 100 may read data from a region selected by an address. During an erase operation, the memory device 100 may erase data from a region selected by an address.

The memory controller 200 may control overall operations of the storage device 50.

When power is applied to the storage device 50, the memory controller 200 may execute firmware. In the case where the memory device 100 is a flash memory device, the memory controller 200 may execute firmware such as a flash translation layer (FTL) for controlling communication between the host 400 and the memory device 100.

In an embodiment, the memory controller 200 may receive data and a logical block address LBA from the host 400, and translate the logical block address into a physical block address PBA indicating an address of a memory cell, in which data is to be stored, and which is included in the memory device 100. The memory controller 200 may store, in the buffer memory 300, a logical-to-physical address mapping table indicating mapping relationship between LBAs and PBAs.

The memory controller 200 may control the memory device 100 to perform a program operation, a read operation, or an erase operation in response to a request from the host 400. During the program operation, the memory controller 200 may provide a program command, a PBA, and data to the memory device 100. During the read operation, the memory controller 200 may provide a read command and a PBA to the memory device 100. During the read operation, the memory controller 200 may provide an erase command and a PBA to the memory device 100.

In various embodiments, the memory controller 200 may receive a read request from the host 400, and count the number of read requests for an LBA corresponding to the read request.

In an embodiment, the memory controller 200 may store cache data information. The cache data information may include read counts which are the numbers of read requests for a plurality of LBAs, and PBAs corresponding to the respective LBAs.

The memory controller 200 may determine cache data that is data to be transferred to the read cache memory block 102 among data stored in the main memory block 101, based on the cache data information.

In detail, the memory controller 200 may determine data of which a read count or the number of data read requests exceeds the threshold value (TH) among data stored in the main memory block 101, to be the cache data.

In an embodiment, the memory controller 200 may control a plurality of memory devices 100. The memory controller 200 may determine data, of which a read count exceeds the threshold value (TH) among data stored in the main memory block 101 to be the cache data in each of the plurality of memory devices 100. Here, the cache data corresponding to a plurality of pieces of original data may not be read in a data interleaving manner when the cache data corresponding to the plurality of pieces of original data are stored in a single same memory device.

The memory controller 200 may transfer cache data to the read cache memory block 102. In detail, the memory controller 200 may control the memory device 100 to read, from the main memory block 101, cache data to be transferred to the read cache memory block 102, and to program the read data to the read cache memory block 102.

In an embodiment, the memory controller 200 may spread and program the cache data of a plurality of pieces of original data stored in one of the plurality of memory devices to the read cache memory blocks 102 included in the plurality of the memory devices. In this embodiment, the cache data may be read in the data interleaving manner because the cache data corresponding to the plurality of pieces of original data are spread in the different memory devices.

In an embodiment, the memory controller 200 may autonomously generate a program command, an address and data without a request from the host 400, and transmit the program command, the address and the data to the memory device 100. For example, the memory controller 200 may provide a command, an address and data to the memory device 100 to perform background operations such as a program operation for wear leveling, or a program operation for garbage collection.

In an embodiment, the memory controller 200 may control data exchange between the host 400 and the buffer memory 300. Alternatively, the memory controller 200 may temporarily store system data for controlling the memory device 100 to the buffer memory 300. For example, the memory controller 200 may temporarily store, to the buffer memory 300, data input from the host 400, and thereafter transmit the data temporarily stored in the buffer memory 300 to the memory device 100.

In various embodiments, the buffer memory 300 may be used as an operating memory or a cache memory of the memory controller 200. The buffer memory 300 may store codes or commands to be executed by the memory controller 200. Alternatively, the buffer memory 300 may store data to be processed by the memory controller 200.

In an embodiment, the buffer memory 300 may be embodied using an SRAM or a DRAM such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or a rambus dynamic random access memory (RDRAM).

In various embodiments, the storage device 50 may not include the buffer memory 300. In this case, volatile memory devices provided outside the storage 500 may perform the function of the buffer memory 300.

In an embodiment, the memory controller 200 may control at least two memory devices 100. In this case, the memory controller 200 may control the memory devices 100 in an interleaving manner so as to enhance the operating performance.

The host 400 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The storage device 50 may be configured as any one of various types of storage devices depending on a host interface, which is a communication system with the host 400. For example, the data storage device 50 may be configured as any one of various types of storage devices such as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and a memory stick.

The storage device 50 may be manufactured in the form of any one of various package types. For instance, the storage device 50 may be manufactured in the form of any one of various package types such as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

Figure 2:
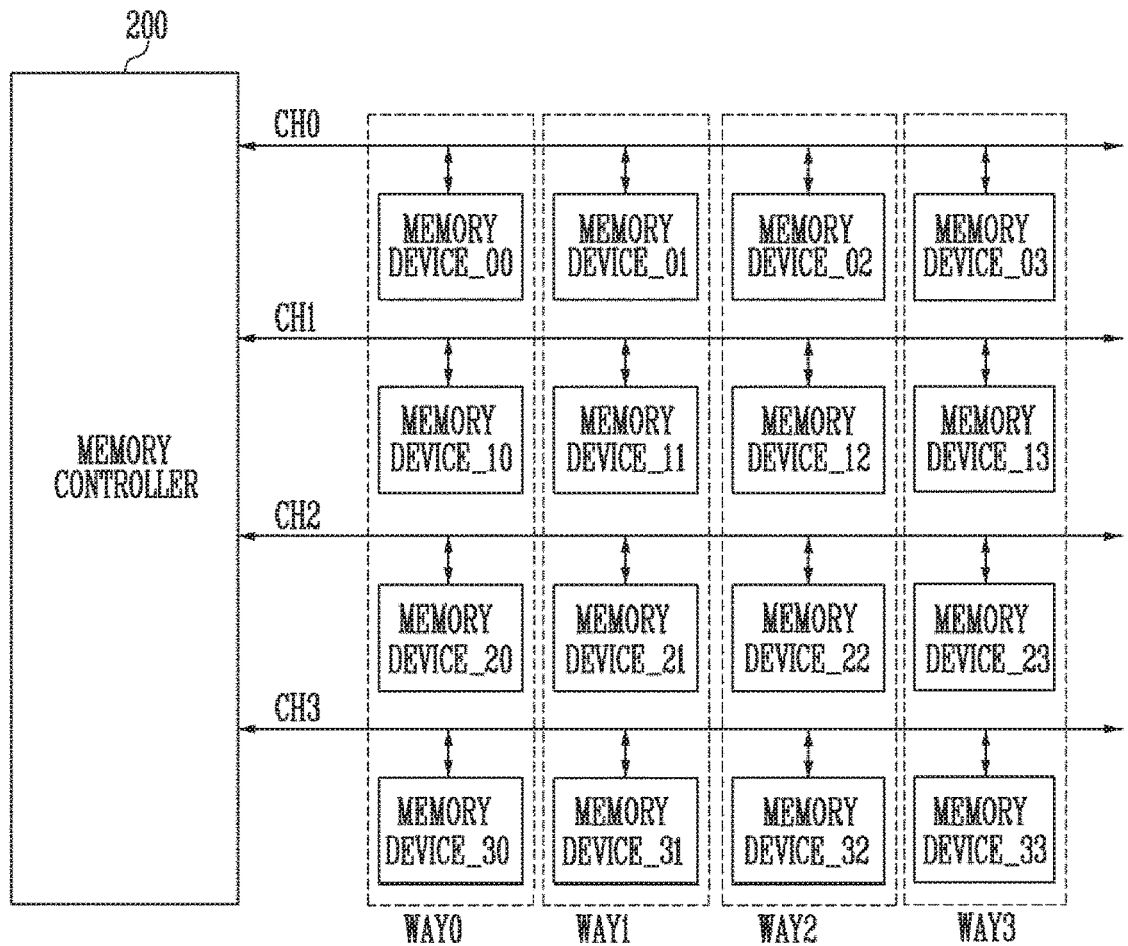
FIG. 2 is a block diagram illustrating an embodiment of connection relationship between a plurality of memory devices and a memory controller of FIG. 1.

FIG. 2 is a block diagram illustrating an embodiment of connection relationship between a plurality of memory devices and the memory controller 200 of FIG. 1.

Referring to FIG. 2, the memory controller 200 may be coupled with a plurality of memory devices (memory device_00 to memory device_33) through a plurality of channels CH0 to CH3. In an embodiment, it is to be noted that the number of channels or the number of memory devices coupled to each channel may be changed in various ways. In this specification, the memory controller 200 are coupled to the memory devices through four channels, and four memory devices are coupled to each channel, however fewer or more channels can be used.

Memory device_00, memory device_01, memory device_02, and memory device_03 may be coupled in common to channel 0 CH0. Memory device_0 memory device_01, memory device_02, and memory device_03 may communicate with the memory controller 200 through channel 0 CH0. Since memory device_00, memory device_01, memory device_02, and memory device_03 are coupled in common to channel 0 CH0, only one memory device may communicate with the memory controller 200 at a time. However, respective internal operations of memory device_00, memory device_01, memory device_02, and memory device_03 may be performed at the same time.

Memory device_10, memory device_11, memory device_12, and memory device_13 may be coupled in common to channel 1 CH1. Memory device_10, memory device_11, memory device_12, and memory device_13 may communicate with the memory controller 200 through channel 1 CH1. Since memory device_10, memory device_11, memory device_12, and memory device_13 are coupled in common to channel 1 CH1, only one memory device may communicate with the memory controller 200 at a time. However, respective internal operations of memory device_10, memory device_11, memory device_12, and memory device_13 may be performed at the same time.

Memory device_20, memory device_21, memory device_22, and memory device_23 may be coupled in common to channel 2 CH2. Memory device_20, memory device_21, memory device_22, and memory device_23 may communicate with the memory controller 200 through channel 2 CH2. Since memory device_20, memory device_21, memory device_22, and memory device_23 are coupled in common to channel 2 CH2, only one memory device may communicate with the memory controller 200 at a time. However, respective internal operations of memory device_20, memory device_21, memory device_22, and memory device_23 may be performed at the same time.

Memory device_30, memory device_31, memory device_32, and memory device_33 may be coupled in common to channel 3 CH3. Memory device_30, memory device_31, memory device_32, and memory device_33 may communicate with the memory controller 200 through channel 3 CH3. Since memory device_30, memory device_31, memory device_32, and memory device_33 are coupled in common to channel 3 CH3, only one memory device may communicate with the memory controller 200 at a time. However, respective internal operations of memory device_30, memory device_31, memory device_32, and memory device_33 may be performed at the same time.

In the storage device using a plurality of memory devices, the performance may be enhanced using data interleaving which is data communication using an interleave scheme. In a structure in which two or more ways share a single channel, the data interleaving may be to perform a read or write operation while changing the ways. For the data interleaving, the memory devices may be managed on a channel and way basis. To maximize parallelization of the memory devices coupled to the respective channels, the memory controller 200 may spread and allocate successive logical memory regions to the channels and the ways.

For example, the memory controller 200 may transmit a command, a control signal including an address, and data to memory device_00 through channel 0 CH0. The data interleaving may be an operation in which, while memory device_00 programs the transmitted data to memory cells included therein, the memory controller 200 transmits a command, a control signal including an address, and data to memory device_01.

Referring to FIG. 2, the plurality of memory devices may be configured of four ways WA0 to WAY3. Way 0 WAY0 may include memory device_00, memory device_10, memory device_20, and memory device_30. Way 1 WAY1 may include memory device_01, memory device_11, memory device_21, and memory device_31. Way 2 WAY2 may include memory device_02, memory device_12, memory device_22, and memory device_32. Way 3 WAY3 may include memory device_03, memory device_13, memory device_23, and memory device_33.

Each of the channels CH to CH3 may be a bus for signals which is shared by the memory devices coupled to the corresponding channel.

Although in FIG. 2 there has been described the case where the data interleaving is applied to a 4-channel/4-way structure, the efficiency of the interleaving may be increased as the number of channels and the number of ways are increased.

Figure 3:
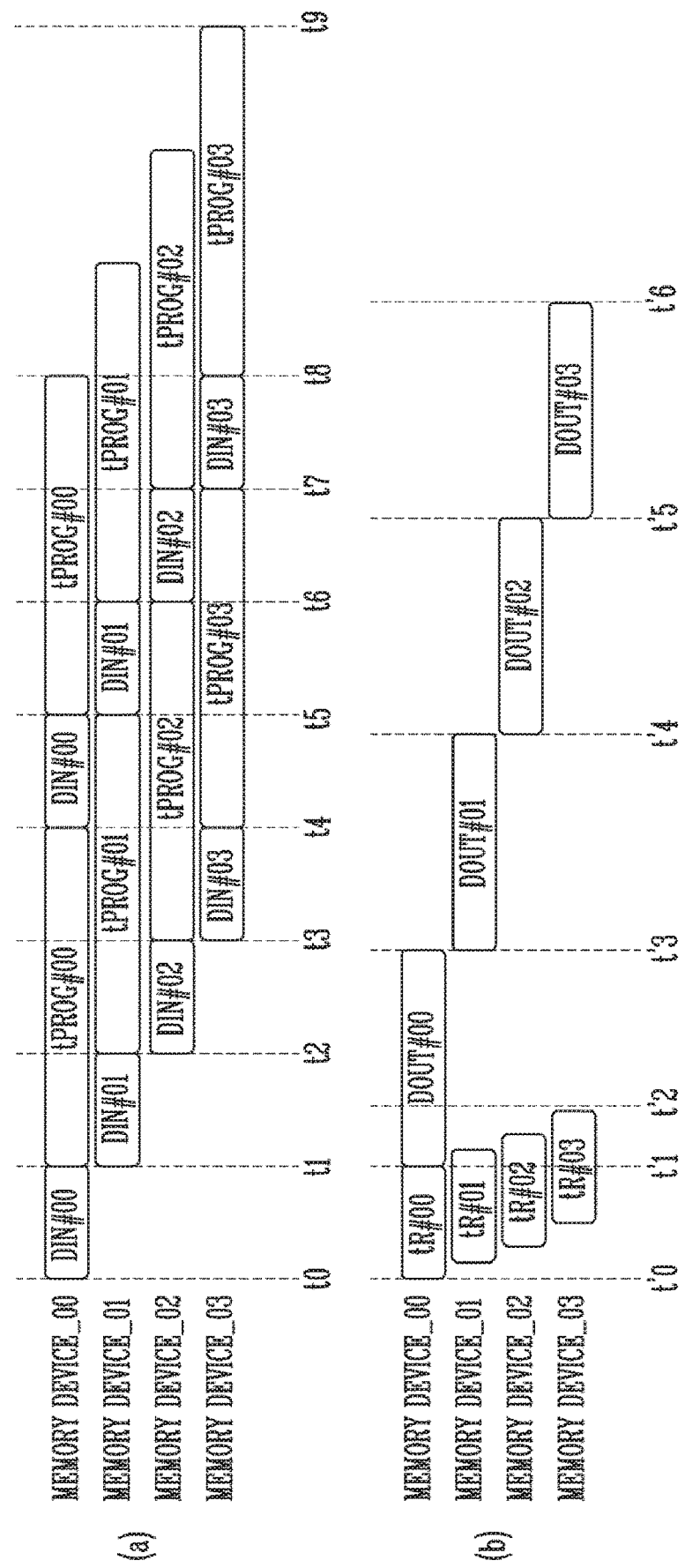
FIG. 3 is a timing diagram illustrating a program operation and a read operation according to data interleaving in accordance with an embodiment of the present disclosure.

FIG. 3 is a timing diagram illustrating a program operation and a read operation according to data interleaving in accordance with an embodiment of the present disclosure.

Referring to FIG. 3, (a) illustrates the program operation, and (b) illustrates the read operation. In FIG. 3, a description will be made for an example where the program operation (a) and the read operation (b) are performed on memory device_00 to memory device_03 coupled in common to channel 0 CH0 of FIG. 2.

Referring to (a) of FIG. 3, during a period from t0 to t1, data input DIN#00 may be performed on memory device_00. Memory device_00 may receive a program command, an address, and data through channel 0 CH0 during the data input DIN#00. Memory device_00, memory device_01, memory device_02, and memory device_03 are coupled in common to channel 0 CH0. Hence, while the data input DIN#00 is performed on memory device_00 during the period from t0 to t1, the other memory devices that are memory device_01, memory device_02, and memory device_03 may not be able to use channel 0 CH0.

During a period from t1 to t2, data input DIN#01 may be performed on memory device_01. Memory device_01 may receive a program command, an address, and data through channel 0 CH0 during the data input DIN#01. Memory device_00, memory device_01, memory device_02, and memory device_03 are coupled in common to channel 0 CH0. Hence, while the data input DIN#01 is performed on memory device_01 during the period from t1 to t2, the other memory devices that are memory device_00, memory device_02, and memory device_03 may not be able to use channel 0 CH0. However, since memory device_00 has received the data during the period from t0 to t1 (DIN#00), memory device_00 may perform a program operation from t1 (tPROG#00).

During a period from t2 to t3, data input DIN#02 may be performed on memory device_02. Memory device_02 may receive a program command, an address, and data through channel 0 CH0 during the data input DIN#02. Memory device_00, memory device_01, memory device_02, and memory device_03 are coupled in common to channel 0 CH0. Hence, while the data input DIN#02 is performed on memory device_02 during the period from t2 to t3, the other memory devices that are memory device_00, memory device_01, and memory device_03 may not be able to use channel 0 CH0. However, since memory device_00 has received the data during the period from t0 to t1 (DIN#00), memory device_00 may perform the program operation from t1 (tPROG#00). In addition, since memory device_01 has received the data during the period from t1 to t2 (DIN#01), memory device_01 may perform a program operation from t2 (tPROG#01).

During a period from t3 to t4, data input DIN#03 may be performed on memory device_03. Memory device_03 may receive a program command, an address, and data through channel 0 CH0 during the data input DIN#03. Memory device_00, memory device_01, memory device_02, and memory device_03 are coupled in common to channel 0 CH0. Hence, while the data input DIN#03 is performed on memory device_03 during the period from t3 to t4, the other memory devices that are memory device_00, memory device_01, and memory device_02 may not be able to use channel 0 CH0. However, since memory device_00 has received the data during the period from t0 to t1 (DIN#00), memory device_00 may perform the program operation from t1 (tPROG#00). In addition, since memory device_01 has received the data during the period from t1 to t2 (DIN#01), memory device_01 may perform the program operation from t2 (tPROG#01). Furthermore, since memory device_02 has received the data during the period from t2 to t3 (DIN#02), memory device_02 may perform a program operation from t3 (tPROG#02).

At t4, the program operation of memory device_00 may be completed (tPROG#00).

Subsequently, during a period from t4 to t8, data input DIN#00, DIN#01, DIN#02, and DIN#03 may be performed on memory device_00 to memory device_03 in the same manner as that performed during the period from t0 to t4.

Referring to (b) of FIG. 3, during a period from t'0 to t'2, each of memory device_00 to memory device_03 may internally read data corresponding to a specific address (tR#00 to tR#03). In an embodiment, memory device_00 to memory device_03 may read data on a page basis. Memory device_00 may read data during a period from t'0 to t'1 (tR#00), and may output the read data to the memory controller through channel 0 CH0 during a period from t'1 to t'3 (DOUT#00).

During a period from t'1 to t'3, memory device_01, memory device_02, and memory device_03 may not be able to use channel 0 CH0 because memory device_00 outputs data through channel 0 CH0 (DOUT#00).

During a period from t'3 to t'4, memory device_01 may output the read data to the memory controller through channel 0 CH0 (DOUT#01). During the period from t'3 to t'4, memory device_00, memory device_02, and memory device_03 may not be able to use channel 0 CH0 because memory device_01 outputs data through channel 0 CH0 (DOUT#01).

During a period from t'4 to t'5, memory device_02 may output the read data to the memory controller through channel 0 CH0 (DOUT#02). During the period from t'4 to t'5, memory device_00, memory device_01, and memory device_03 may not be able to use channel 0 CH0 because memory device_02 outputs data through channel 0 CH0 (DOUT#02).

During a period from t'5 to t'6, memory device_03 may output the read data to the memory controller through channel 0 CH0 (DOUT#03). During the period from t'5 to t'6, memory device_00, memory device_01, and memory device_02 may not be able to use channel 0 CH0 because memory device_03 outputs data through channel 0 CH0 (DOUT#03).

Figure 4:
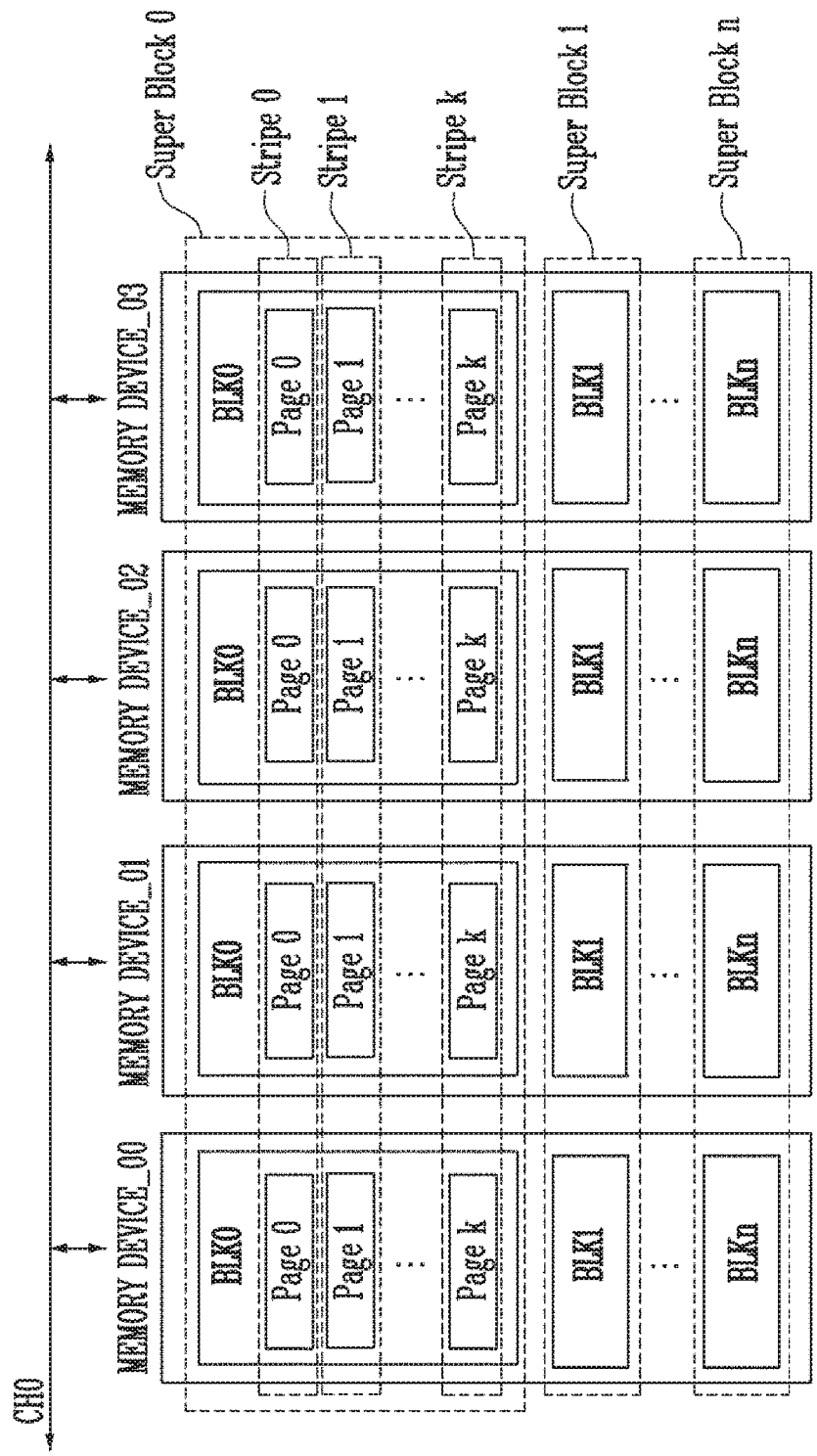
FIG. 4 is a diagram illustrating a super block and a super page in accordance with an embodiment of the present disclosure.

FIG. 4 is a diagram illustrating a super block and a super page in accordance with an embodiment of the present disclosure.

Referring to FIG. 4, four memory devices including memory device_00 to memory device_03 may be coupled in common to channel 0 CH0.

Referring to FIG. 4, each of the memory devices (memory device_00 to memory device_03) may include zeroth to n-th memory blocks BLK0 to BLKn. Each memory block may include zeroth to k-th pages Page 0 to Page k.

The memory controller may control, on a super block basis, memory blocks included in a plurality of memory devices coupled in common to each channel. For example, zeroth memory blocks BLK0 included in memory device_00 to memory device_03 may form a zeroth super block Super Block 0. Therefore, memory device_00 to memory device_03 coupled to channel 0 CH0 may include zeroth to n-th super blocks Super Block 0 to Super Block n.

Each super block may include a plurality of super pages. Each super page may include a plurality of pages. For example, zeroth pages Page 0 included in a plurality of zeroth memory blocks BLK0 of a zeroth super block Super Block 0 may form a zeroth super page Super Page 0.

Therefore, each super block may include zeroth to k-th super pages Super Page 0 to Super Page k.

When storing data to memory device_00 to memory device_03 or reading the stored data, the memory controller may store or read data on a super page basis.

In this case, a program operation of storing data to a single super page or a read operation of reading the stored data may be performed in the data interleaving manner described with reference to FIG. 3.

Figure 5:
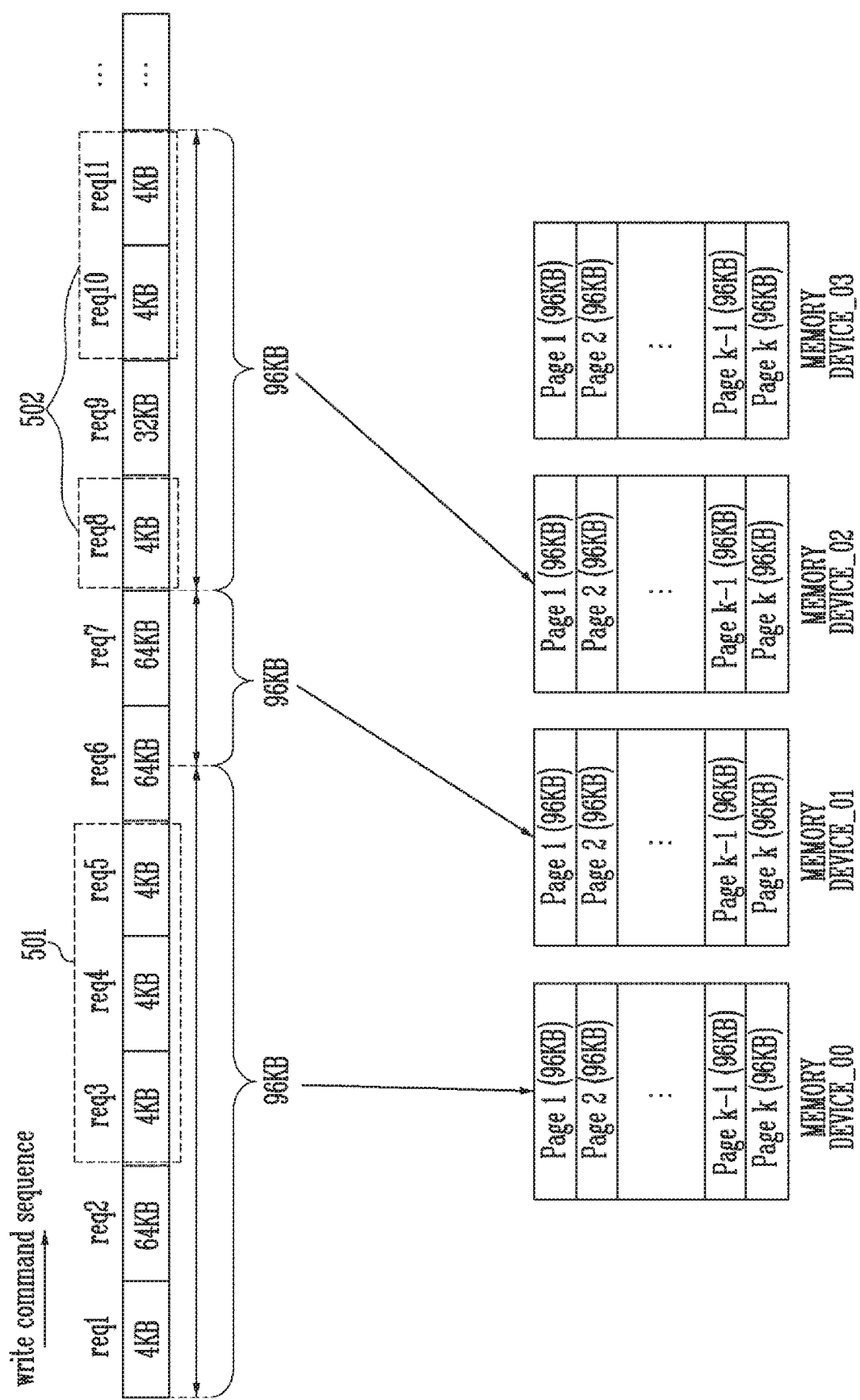
FIG. 5 is a diagram illustrating an operation of storing data to a plurality of memory devices in accordance with an embodiment of the present disclosure.

FIG. 5 is a diagram illustrating an operation of storing data to a plurality of memory devices in accordance with an embodiment of the present disclosure.

Referring to FIG. 5, according to an input sequence of a write request input from the host, data corresponding to the write request may be stored to memory device_00 to memory device_03 coupled in common to channel 0 CH0.

In an embodiment, a program operation of storing data in memory device_00 to memory device_03 may be performed on a page basis.

In detail, each of memory device_00 to memory device_03 may include first to k-th pages Page 1 to Page k. Each page may store data having a size of 96 KB.

According to a write command sequence generated by the memory controller in response to a write request input from the host, data respectively corresponding to first to eleventh requests req1 to req11 may be sequentially stored in memory device_00 to memory device_03.

The first request may be a write request for data having a size of 4 KB, the second request may be a write request for data having a size of 64 KB, the third request may be a write request for data having a size of 4 KB, the fourth request may be a write request for data having a size of 4 KB, the fifth request may be a write request for data having a size of 4 KB, the sixth request may be a write request for data having a size of 64 KB, the seventh request may be a write request for data having a size of 64 KB, the eighth request may be a write request for data having a size of 4 KB, the ninth request may be a write request for data having a size of 32 KB, the tenth request may be a write request for data having a size of 4 KB, and the eleventh request may be a write request for data having a size of 4 KB.

Each of the pages included in memory device_00 to memory device_03 may store data of 96 KB. Hence, the memory controller 200 may store data corresponding to a series of requests to memory device_00 to memory device_03 on a 96 KB basis, rather than storing data on a request basis.

In an embodiment, the memory controller 200 may perform a program operation on memory device_00 to memory device_03 in the data interleaving manner. Furthermore, the memory cells included in memory device_00 to memory device_03 may be managed on a super block or super page basis described with reference to FIG. 4.

Therefore, data corresponding to the first to fifth requests and some of 64 KB data corresponding to the sixth request may be stored to memory device_00. The rest of the 64 KB data corresponding to the sixth request and some of 64 KB data corresponding to the seventh request may be stored to memory device_01. The rest of the 64 KB data corresponding to the seventh request and data corresponding to the eighth to eleventh requests may be stored to memory device_02.

After the data has been stored according to the embodiment of FIG. 5, a read request for each data may be input. According to a logical block address (LBA) included in a read request, the memory controller 200 may detect a physical block address (PBA) corresponding to the corresponding logical block address (LBA), and read data stored in the corresponding physical block address (PBA).

It is assumed that a read request of the host for the 4 KB data input in response to each of the third to fifth requests req3 to req5 is frequently input. Furthermore, it is assumed that a read request of the host for the 4 KB data input in response to each of the eighth, tenth, and eleventh requests req8, req10, and req11 is frequently input.

Since the 4 KB data input in response to each of the third to fifth requests req3 to req5 is stored in the single memory device_00, a read operation for these 4 KB data (i.e., data corresponding to the third to fifth requests req3 to req5) cannot be performed in the data interleaving manner. The memory controller 200 may provide read commands respectively corresponding to the third to fifth requests req3 to req5 to memory device_00 so as to read the data corresponding to the third to fifth requests req3 to req5. In other words, the memory controller 200 may provide three read commands to the memory device_00 in response to the third to fifth requests req3 to req5. Memory device_00 may perform three read operations corresponding to the three read commands.

Since the 4 KB data input in response to each of the eighth, tenth and eleventh requests req8, req10, and req11 is stored in the single memory device_02, a read operation for these 4 KB data (i.e., data corresponding to the eighth, tenth and eleventh requests req8, req10, and req11) cannot be performed in the data interleaving manner. The memory controller 200 may provide read commands respectively corresponding to the eighth, tenth and eleventh requests req8, req10, and req11 to memory device_02 so as to read the data corresponding to the eighth, tenth and eleventh requests req8, req10, and req11. In other words, the memory controller 200 may provide three read commands to the memory device_02 in response to the eighth, tenth and eleventh requests req8, req10, and req11. Memory device_02 may perform three read operations corresponding to the three read commands.

In the case where data is stored according to the embodiment of FIG. 5, the data cannot be read in the data interleaving manner because data having a high read frequency and a small size is stored in the single memory device (e.g., each of the memory device_00 and the memory device_02 in the above example) in the unit of a large size (96 KB). Consequently, performance degradation may be caused.

Therefore, in embodiments of the present disclosure, data that has a high read frequency and cannot be read in the data interleaving manner may be spread and stored to read cache memory blocks of a plurality of memory devices so that the data having the high read frequency can be more rapidly read.

In various embodiments of the present disclosure, the number of pages included in each memory device or the size of data capable of being stored in each page are not limited to those of the embodiment of FIG. 5. In other words, each memory device may include a plurality of memory blocks each of which includes first to k-th pages. The capacity of data capable of being stored in each page may be set to various values, e.g., 4 KB, 8 KB, 16 KB, 64 KB, 128 KB or 1024 KB.

Figure 6:
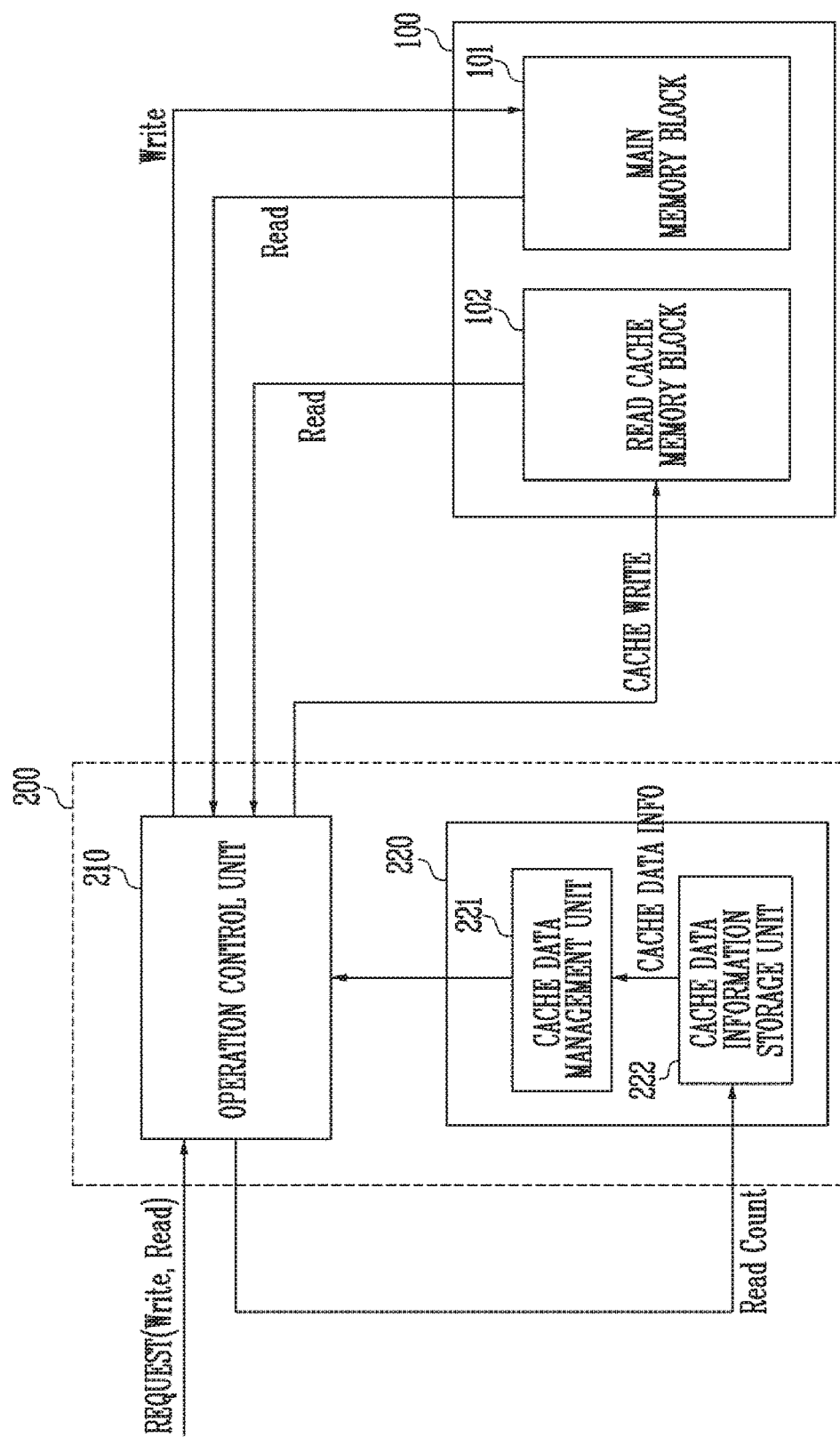
FIG. 6 is a diagram illustrating the configuration of the memory controller of FIG. 1.

FIG. 6 is a diagram illustrating the configuration of the memory controller 200 of FIG. 1.

Referring to FIG. 6, the memory controller 200 may include an operation control unit 210 and a read cache block control unit 220.

The read cache block control unit 220 may include a cache data management unit 221 and a cache data information storage unit 222.

The operation control unit 210 may receive requests input from the host. In an embodiment, each of the requests may be a write request Write or a read request Read. The operation control unit 210 may be a component of the firmware such as the FTL described with reference to FIG. 1.

When a write request is input, the operation control unit 210 may store data corresponding to the associated write request to the main memory block 101 of the memory device 100.

When a read request is input, the operation control unit 210 may read data corresponding to the associated read request from the main memory block 101. The operation control unit 210 may provide the read data to the host.

In an embodiment, after having performed a read request, the operation control unit 210 may provide a read count of a logical block address LBA corresponding to the read request to the cache data information storage unit 222.

The cache data information storage unit 222 may store cache data information.

The cache data information may include read counts which are the numbers of read requests for a plurality of logical block addresses (LBAs), and physical block addresses (PBAs) corresponding to the respective LBAs.

The cache data information storage unit 222 may provide the stored cache data information CACHE DATA INFO to the cache data management unit 221.

The cache data management unit 221 may determine cache data that is data to be transferred to the read cache memory block 102 among data stored in the main memory block 101, based on the cache data information.

In detail, the cache data management unit 221 may determine data of which a read count or the number of data read requests exceeds the threshold value (TH) among data stored in the main memory block 101, to be the cache data.

In an embodiment, the memory controller 200 may control a plurality of memory devices 100. The cache data management unit 221 may determine data, of which a read count exceeds the threshold value (TH) among data stored in the main memory blocks 101 to be the cache data in each of the plurality of memory devices 100. Here, the cache data corresponding to a plurality of pieces of original data may not be read in a data interleaving manner when the cache data corresponding to the plurality of pieces of original data are stored in a single memory device.

The cache data management unit 221 may provide a physical block address (PBA) of the cache data which is information about the cache data, to the operation control unit 210. The operation control unit 210 may read data corresponding to the PBA of the cache data from the main memory block 101, and perform a cache write operation of storing the read data to the read cache memory block 102.

In an embodiment, a program or read speed of the read cache memory block 102 may be higher than that of the main memory block 101. In an embodiment, the read cache memory block 102 may be formed of SLCs each of which stores one-bit data. Alternatively, the main memory block 101 may be formed of MLCs each of which stores two data bits, TLCs each of which stores three data bits, or QLCs each of which stores four data bits.

In various embodiments, during a cache write operation, the operation control unit 210 may spread and program data to the read cache memory blocks 102 included in the plurality of memory devices 100. In other words, the operation control unit 210 may spread and store cache data of a single memory device to the plurality of memory devices 100 so as to enable the read cache memory blocks 102 to be read according to the data interleaving scheme.

Figure 7:
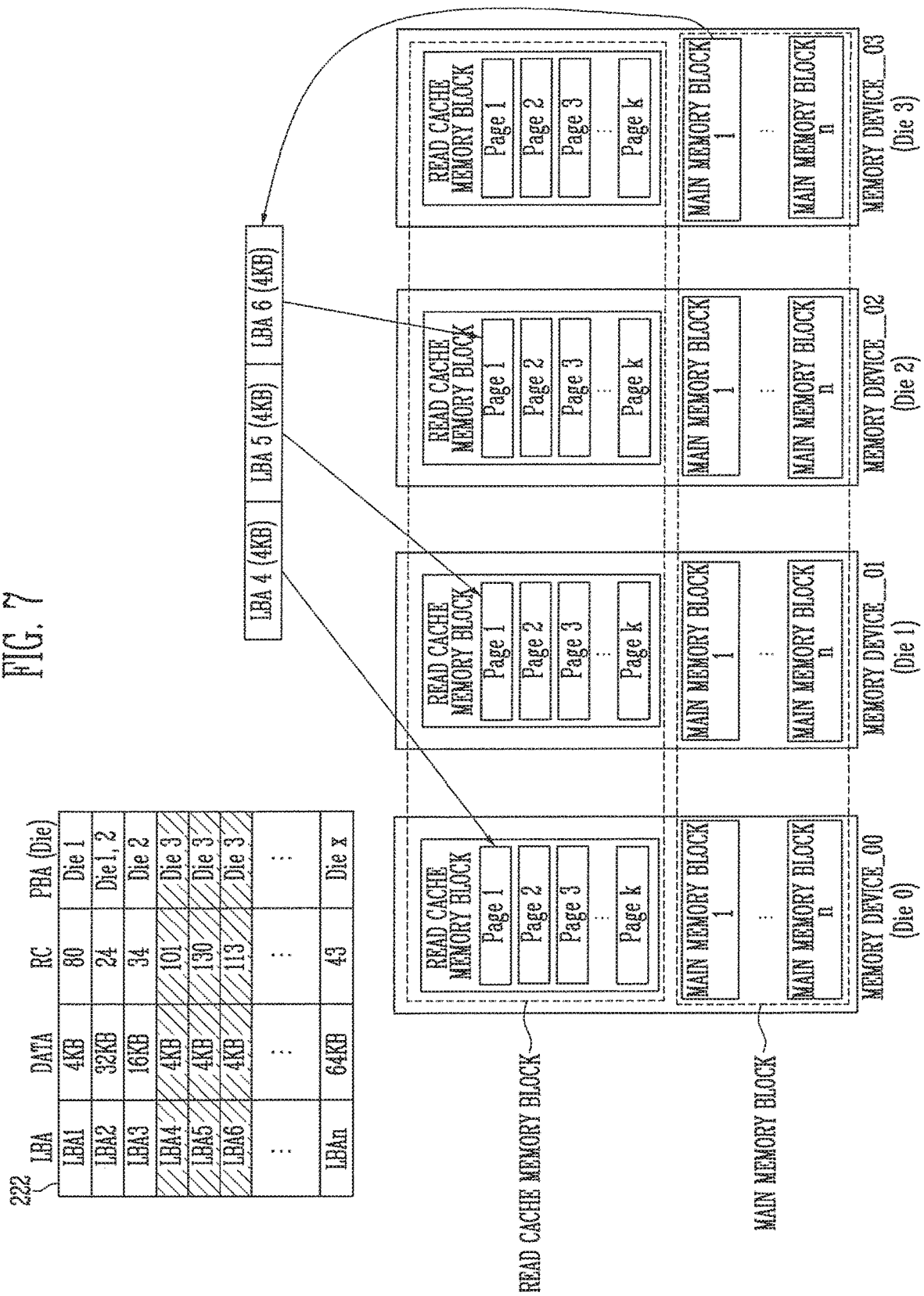
FIG. 7 is a diagram illustrating an operation of storing cache data to a read cache memory block in accordance with an embodiment of the present disclosure.

FIG. 7 is a diagram illustrating an operation of storing cache data to the read cache memory block 102 in accordance with an embodiment of the present disclosure.

Referring to FIG. 7, each of memory device_00 to memory device_03 may include a main memory block and a read cache memory block.

In an embodiment, each of memory device_00 to memory device_03 may include main memory block 1 to main memory block n. In an embodiment, memory cells included in each main memory block may be formed of MLCs each of which stores two data bits, TLCs each of which stores three data bits, or QLCs each of which stores four data bits.

In an embodiment, a program or read speed of the read cache memory block may be higher than that of the main memory block. In an embodiment, the read cache memory block may be formed of SLCs each of which stores one-bit data.

The memory controller 200 may determine cache data which is data to be transferred to the read cache memory block among data stored in the main memory block according to cache data information stored in the cache data information storage unit 222 in each of the memory devices (i.e., the memory device_00 to the memory device_03).

The cache data information storage unit 222 may store a logical block address (LBA), the size of data, a read count (RC), and a physical block address (PBA). In an embodiment, the PBA may be a die number indicating a memory device in which data corresponding to an associated LBA is stored among the memory devices (i.e., the memory device_00 to the memory device_03).

Referring to FIG. 7, the memory controller 200 may determine cache data based on the cache data information. The cache data may be data of which a read count value for the LBA exceeds the threshold value (TH). In FIG. 7, it is assumed that the threshold value (TH) is 100.

Data corresponding to each of fourth to sixth LBAs LBA 4 to LBA 6 may be data which has a size of 4 KB and a read count exceeding the threshold value (TH). The data corresponding to the fourth to sixth LBAs LBA 4 to LBA 6 may be stored in the main memory block of memory device_03 (Die 3).

Hence, the memory controller 200 may determine the data corresponding to the fourth to sixth LBAs LBA 4 to LBA 6 to be cache data.

The memory controller 200 may read the data corresponding to the fourth to sixth LBAs LBA 4 to LBA 6 stored in the main memory block of memory device_03. The memory controller 200 may store the read data (i.e., the cache data of the memory device_03) corresponding to the fourth to sixth LBAs LBA 4 to LBA 6 to the read cache memory blocks of the memory devices (i.e., the memory device_00 to the memory device_03). That is, the memory controller 200 may spread and store the read data (i.e., the cache data of the memory device_03) to the memory devices (i.e., the memory device_00 to the memory device_03) so that data corresponding to each LBA can be read in the data interleaving manner. For example, 4 KB data corresponding to the fourth LBA LBA 4 may be stored to the read cache memory block of memory device_00, 4 KB data corresponding to the fifth LBA LBA 5 may be stored to the read cache memory block of memory device_01, and 4 KB data corresponding to the sixth LBA LBA 6 may be stored to the read cache memory block of memory device_02.

Figure 8:
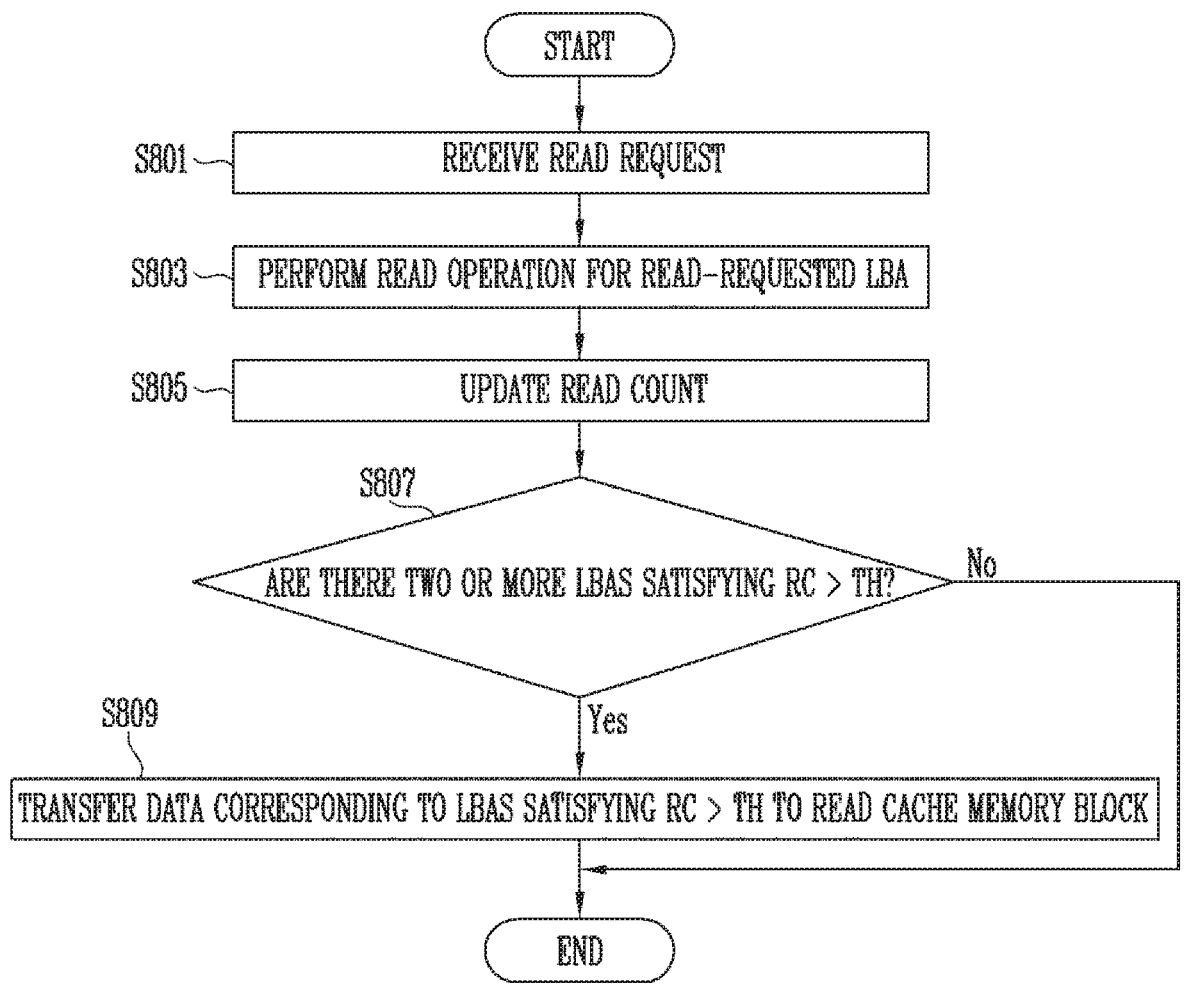
FIG. 8 is a flowchart illustrating an operation of the storage device in accordance with an embodiment of the present disclosure.

FIG. 8 is a flowchart illustrating an operation of the storage device 50 in accordance with an embodiment of the present disclosure.

Referring to FIG. 8, at step S801, the storage device 50 may receive a read request from the host. The read request may include an LBA, which is a logical block address of data to be read.

At step S803, the storage device 50 may perform a read operation for the corresponding LBA. For example, the storage device 50 may detect a PBA corresponding to the read requested LBA, read data stored at the corresponding PBA, and then provide the read data to the host.

At step S805, the storage device 50 may update the read count of the LBA at which the read request has been performed. In detail, the storage device 50 may increase the read count of the corresponding LBA and store the increased read count value.

At step S807, the storage device 50 may determine whether there are two or more LBAs, the read count of each of which exceeds the threshold value TH. If there are two or more LBAs, the read count of each of which exceeds the threshold value TH, the storage device 50 may proceed to step S809, and, if not, the storage device 50 may terminate the process.

At step S809, the storage device 50 may transfer data corresponding to the LBAs, the read count of each of which exceeds the threshold value TH, to the read cache memory block. Step S809 will be described in more detail with reference to FIG. 9.

Figure 9:
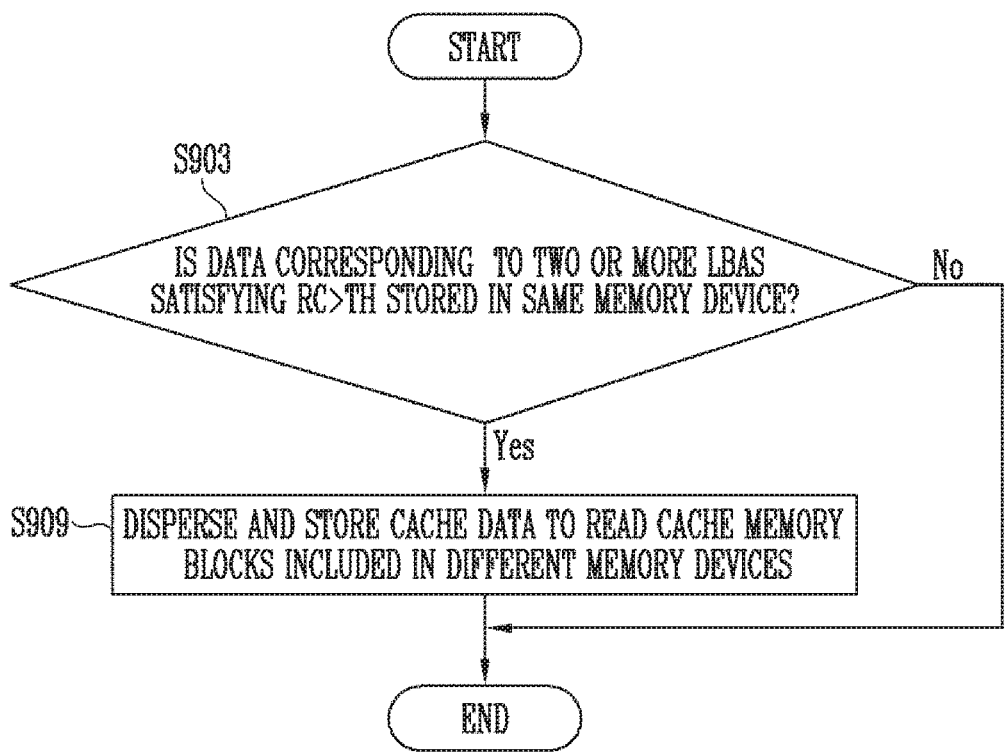
FIG. 9 is a flowchart illustrating an operation of the storage device in accordance with an embodiment of the present disclosure.

FIG. 9 is a flowchart illustrating an operation of the storage device 50 in accordance with an embodiment of the present disclosure.

Referring to FIG. 9, at step S903, the storage device 50 may determine whether two or more pieces of data respectively corresponding to the two or more LBAs, the read count of each of which exceeds the threshold value TH, are stored in the same memory device. If two or more pieces of data respectively corresponding to the two or more LBAs, the read count of each of which exceeds the threshold value TH, are not stored in the same memory device, the process may be terminated because a read operation on the main data block may be performed in the data interleaving manner. However, if two or more pieces of data respectively corresponding to the two or more LBAs, the read count of each of which exceeds the threshold value TH, are stored in the same memory device, the process proceeds to step S909 because the read operation cannot be performed with the two or more pieces of data stored in the same memory device in the data interleaving manner.

At step S909, the storage device 50 may spread and store cache data of the two or more pieces of data respectively corresponding to the two or more LBAs, the read count of each of which exceeds the threshold value TH, to read cache memory blocks included in different memory devices. In an embodiment, memory cells included in each main memory block may be formed of MLCs each of which stores two data bits, TLCs each of which stores three data bits, or QLCs each of which stores four data bits. In an embodiment, a program or read speed of the read cache memory block may be higher than that of the main memory block. In an embodiment, the read cache memory block may be formed of SLCs each of which stores one-bit data.

Figure 10:
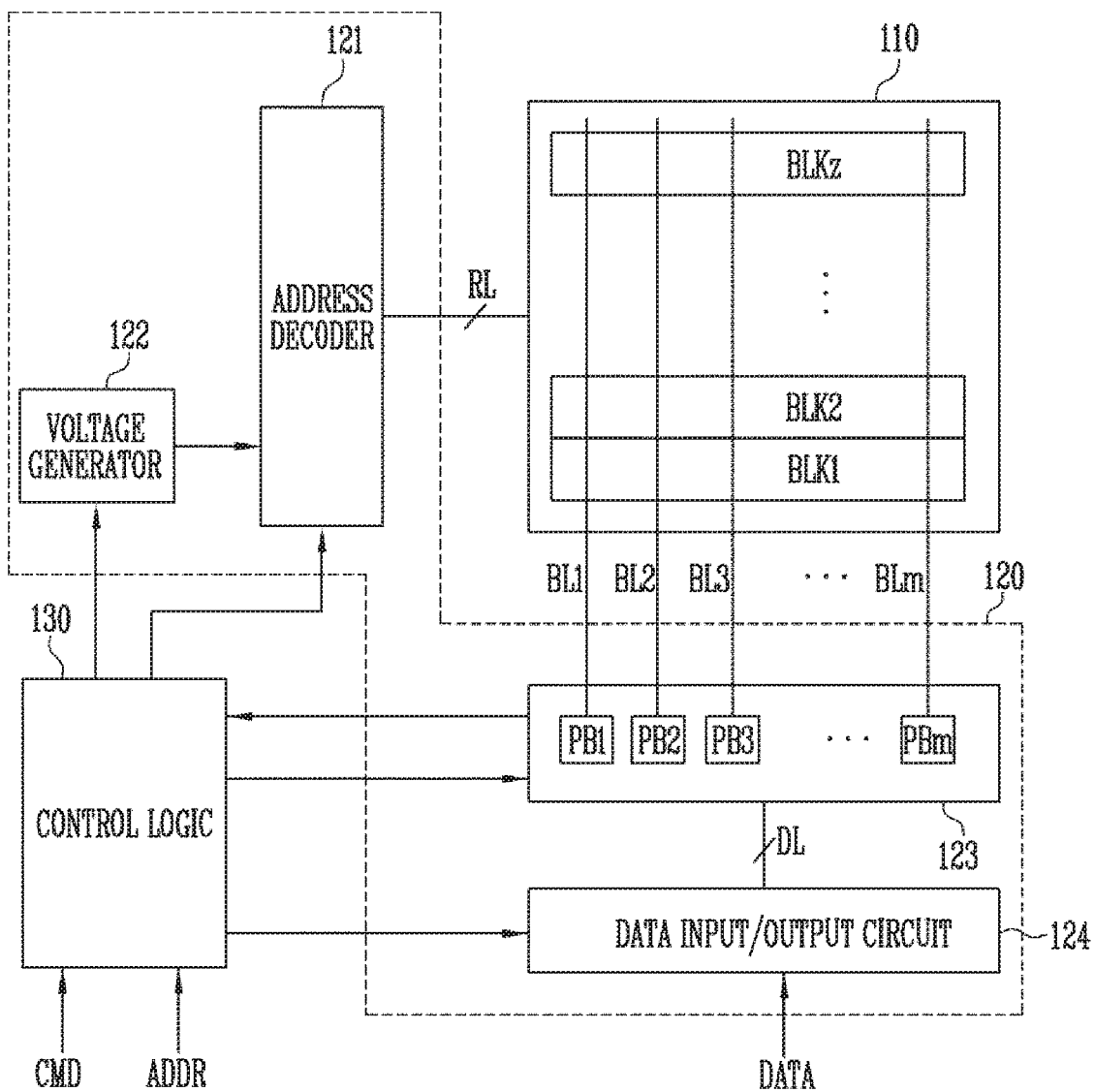
FIG. 10 is a diagram illustrating the configuration of a memory device of FIG. 1.

FIG. 10 is a diagram illustrating the configuration of the memory device 100 of FIG. 1.

Referring to FIG. 10, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to an address decoder 121 through row lines RL. The plurality of memory blocks BLK1 to BLKz are coupled to a read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 is formed of a plurality of pages. In an embodiment, each of the memory blocks BLK1 to BLKz included in the memory cell array 110 may include a plurality of dummy cells. Here, one or more dummy cells may be coupled in series between a drain select transistor and memory cells, and between a source select transistor and the memory cells.

Each of the memory cells of the memory device 100 may be formed of an SLC capable of storing a single data bit, a MLC capable of storing two data bits, a TLC capable of storing three data bits, or a QLC capable of storing four data bits.

The peripheral circuit 120 may include an address decoder 121, a voltage generator 122, a read/write circuit 123, and a data input/output circuit 124.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address among the received addresses ADDR. The address decoder 121 may select at least one word line WL of the selected memory block by applying voltages supplied from the voltage generator 122 to at least one word line WL according to the decoded row address.

During a program operation, the address decoder 121 may apply a program voltage to a selected word line and apply a pass voltage having a level lower than that of the program voltage to unselected word lines. During a program verify operation, the address decoder 121 may apply a verify voltage to a selected word line and apply a verify pass voltage higher than the verify voltage to unselected word lines.

During a read operation, the address decoder 121 may apply a read voltage to a selected word line and apply a pass voltage higher than the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select a corresponding memory block according to the decoded block address. During the erase operation, the address decoder 121 may apply a ground voltage to word lines coupled to the selected memory block.

In an embodiment, the address decoder 121 may decode a column address among the transmitted addresses ADDR. A decoded column address DCA may be transmitted to the read/write circuit 123. In an embodiment, the address decoder 121 may include components such as a row decoder, a column decoder, and an address buffer.

The voltage generator 122 may generate a plurality of voltages using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using the external supply voltage or the internal supply voltage. The voltage generator 122 may generate various voltages required in the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal supply voltage, and generate a plurality of voltages by selectively activating the plurality of pumping capacitors under control of the control logic 130.

The generated voltages may be supplied to the memory cell array 110 by the address decoder 121.

The read/write circuit 123 may include first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm may operate under control of the control logic 130.

The first to m-th page buffers PB1 to PBm may perform data communication with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program allowable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read page data from selected memory cells through the bit lines BL1 to BLm.

During a read operation, the read/write circuit 123 may read data DATA from the memory cells in the selected page through the bit lines BL, and output the read data DATA to the data input/output circuit 124.

During an erase operation, the read/write circuit 123 may float the bit lines BL. In an embodiment, the read/write circuit 123 may include a column select circuit.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving inputted data. During a program operation, the data input/output circuit 124 may receive data DATA to be stored from an external controller (not shown). During a read operation, the data input/output circuit 124 may output, to the external controller, the data received from the first to m-th page buffers PB1 to PBm included in the read/write circuit 123.

The control logic 130 may be coupled to the address decoder 121, the voltage generator 122, the read/write circuit 123, and the data input/output circuit 124. The control logic 130 may control the overall operation of the memory device 100. The control logic 130 may operate in response to a command CMD transmitted from an external device.

Figure 11:
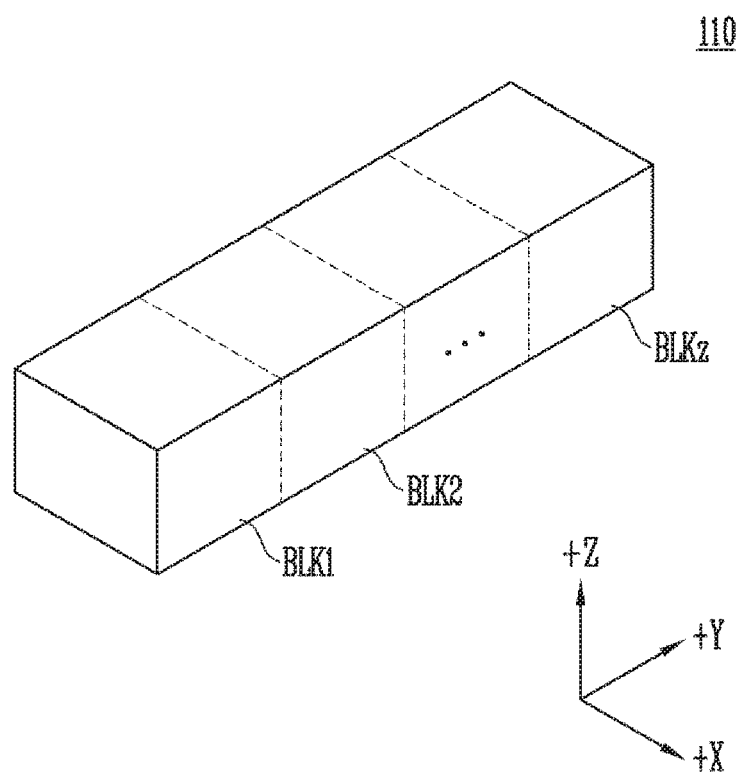
FIG. 11 is a diagram illustrating an embodiment of a memory cell array 110 of FIG. 10.

FIG. 11 is a diagram illustrating an embodiment of a memory cell array 110 of FIG. 10.

Referring to FIG. 11, the memory cell array 110 may include a plurality of memory blocks BLK1 to BLKz. Each memory block may have a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 12 and 13.

Figure 12:
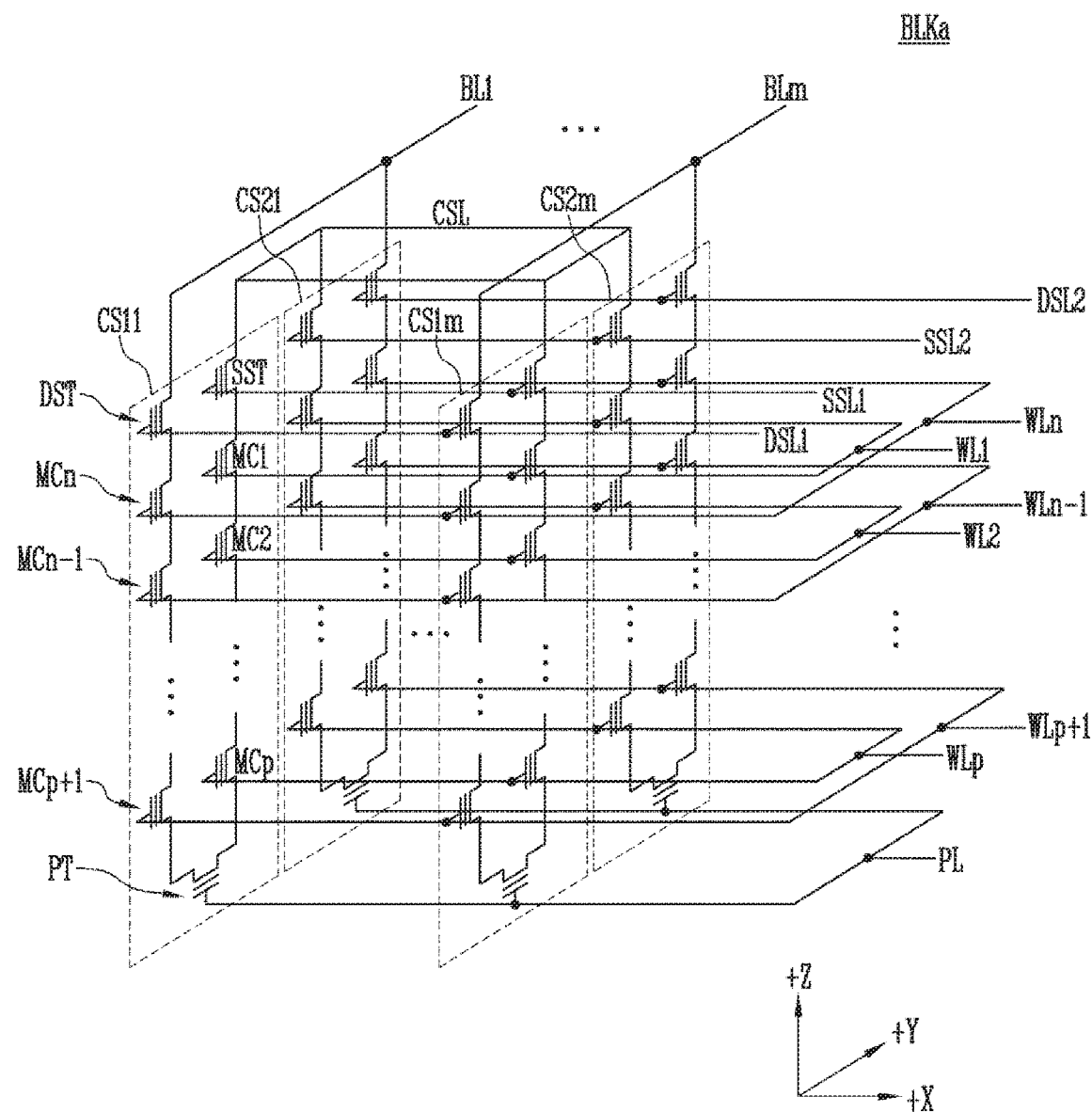
FIG. 12 is a circuit diagram illustrating any one memory block BLKa of memory blocks BLK1 to BLKz of FIG. 11, in accordance with an embodiment of the present disclosure.

FIG. 12 is a circuit diagram illustrating any one memory block BLKa of memory blocks BLK1 to BLKz of FIG. 10, in accordance with an embodiment of the present disclosure.

Referring to FIG. 12, the memory block BLKa may include a plurality of cell strings CS11 to CS1$m$ and CS21 to CS2$m$. In an embodiment, each of the cell strings CS11 to CS1$m$ and CS21 to CS2$m$ may be formed in a 'U' shape. In the memory block BLKa, m cell strings may be arranged in a row direction (i.e., the +X direction). In FIG. 12, two cell strings are illustrated as being arranged in a column direction (i.e., the +Y direction). However, this illustration is made only for convenience of description, and it will be understood that three or more cell strings may be arranged in the column direction.

Each of the plurality of cell strings CS11 to CS1$m$ and CS21 to CS2$m$ may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 12, source select transistors of the cell strings CS11 to CS1$m$ in a first row are coupled to a first source select line SSL1. Source select transistors of the cell strings CS21 to CS2$m$ in a second row are coupled to a second source select line SSL2.

In an embodiment, the source select transistors of the cell strings CS11 to CS1$m$ and CS21 to CS2$m$ may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a direction opposite to the +Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 12, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from the selected cell strings.

In an embodiment, even bit lines and odd bit lines may be provided in lieu of the first to m-th bit lines BL1 to BLm. Even-number-th cell strings of the cell strings CS11 to CS1m or CS21 to CS2m arranged in the row direction may be coupled to respective even bit lines. Odd-number-th cell strings of the cell strings CS11 to CS1m or CS21 to CS2m arranged in the row direction may be coupled to respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCp. Alternatively, at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one dummy memory cells, each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 13:
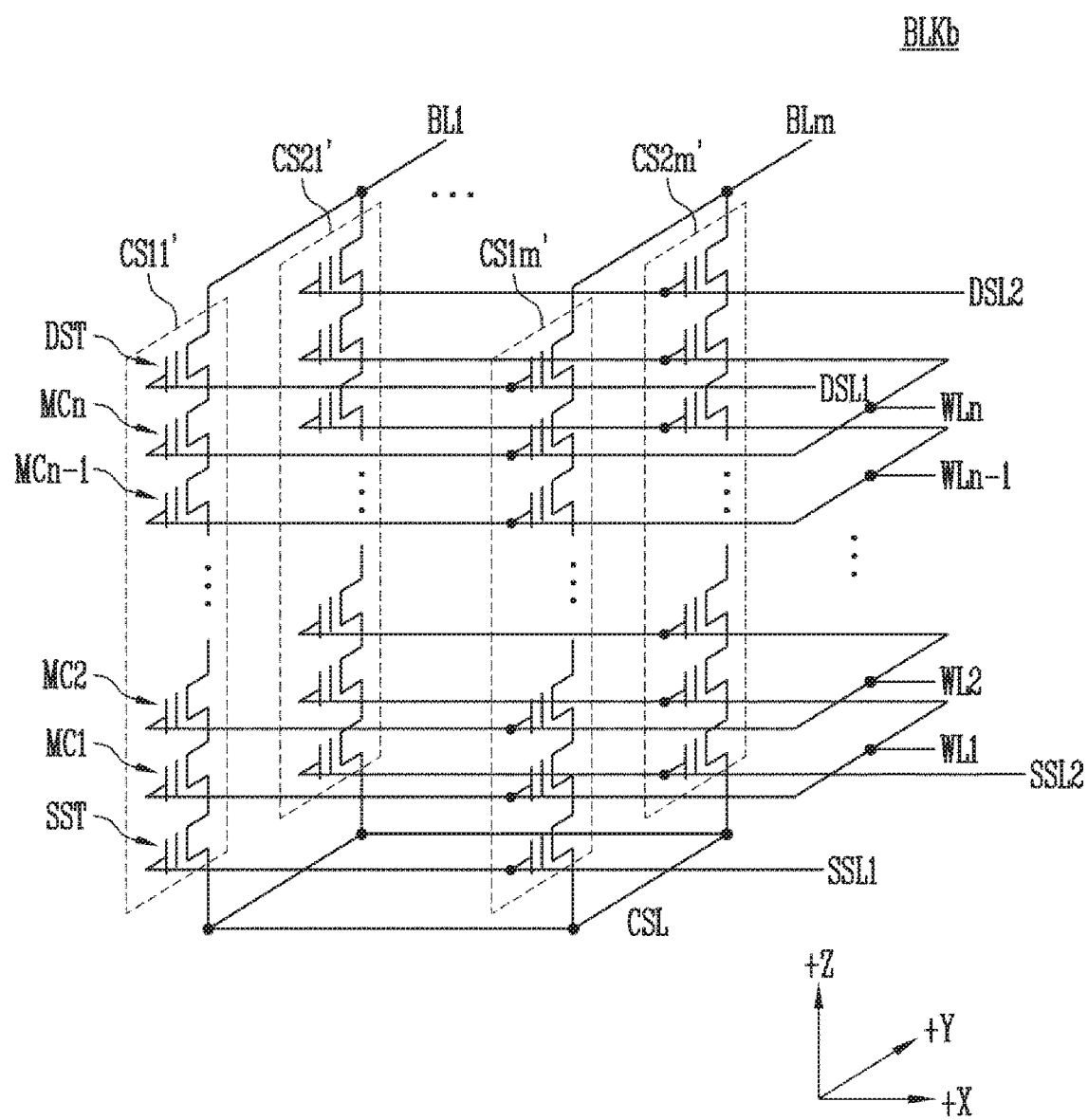
FIG. 13 is a circuit diagram illustrating any one memory block BLKb of the memory blocks BLK1 to BLKz of FIG. 11 in accordance with an embodiment of the present disclosure.

FIG. 13 is a circuit diagram illustrating any one memory block BLKb of the memory blocks BLK1 to BLKz of FIG. 11 in accordance with an embodiment of the present disclosure.

Referring to FIG. 13, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequentially, the memory block BLKb of FIG. 13 may have an equivalent circuit similar to that of the memory block BLKa of FIG. 12 except that a pipe transistor PT is excluded from each cell string.

In an embodiment, even bit lines and odd bit lines may be provided in lieu of the first to m-th bit lines BL1 to BLm. Even-number-th cell strings among the cell strings CS11' to CS1m' or CS21' to CS2m' arranged in the row direction may be coupled to the respective even bit lines, and odd-number-th cell strings among the cell strings CS11' to CS1m' or CS21' to CS2m' arranged in the row direction may be coupled to the respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCn. Alternatively, at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one dummy memory cells, each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 14:
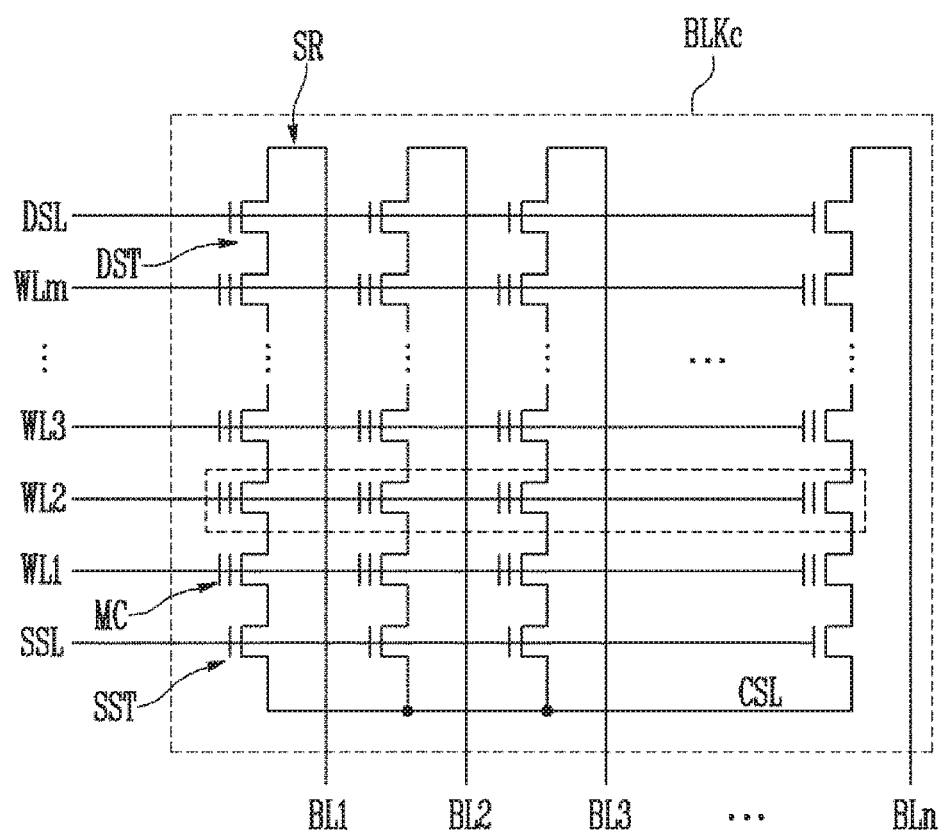
FIG. 14 is a circuit diagram illustrating any one memory block BLKc of the memory blocks BLK1 to BLKz included in the memory cell array 110 of FIG. 10 in accordance with an embodiment of the present disclosure.

FIG. 14 is a circuit diagram illustrating any one memory block BLKc of the memory blocks BLK1 to BLKz included in the memory cell array 110 of FIG. 10 in accordance with an embodiment of the present disclosure.

Referring to FIG. 14, the memory block BKLc may include a plurality of strings SR. The plurality of strings SR may be respectively coupled to a plurality of bit lines BL1 to BLn. Each string SR may include a source select transistor SST, memory cells MC, and a drain select transistor DST.

The source select transistor SST of each string SR may be coupled between the memory cells MC and a common source line CSL. The source select transistors SST of the strings SR may be coupled in common to the common source line CSL.

The drain select transistor DST of each string SR may be coupled between the memory cells MC and the corresponding bit line BL. The drain select transistors DST of the strings SR may be respectively coupled the bit lines BL1 to BLn.

In each string SR, a plurality of memory cells MC may be provided between the source select transistor SST and the drain select transistor DST. In each string SR, the memory cells MC may be coupled in series with each other.

In the strings SR, memory cells MC disposed in the same turn from the common source line CSL may be coupled in common to a single word line. The memory cells MC of the strings SR may be coupled to a plurality of word lines WL1 to WLm.

In the memory block BLKc, an erase operation may be performed on a memory block basis. When the erase operation is performed on a memory block basis, all memory cells of the memory block BLKc may be simultaneously erased in response to an erase request.

Figure 15:
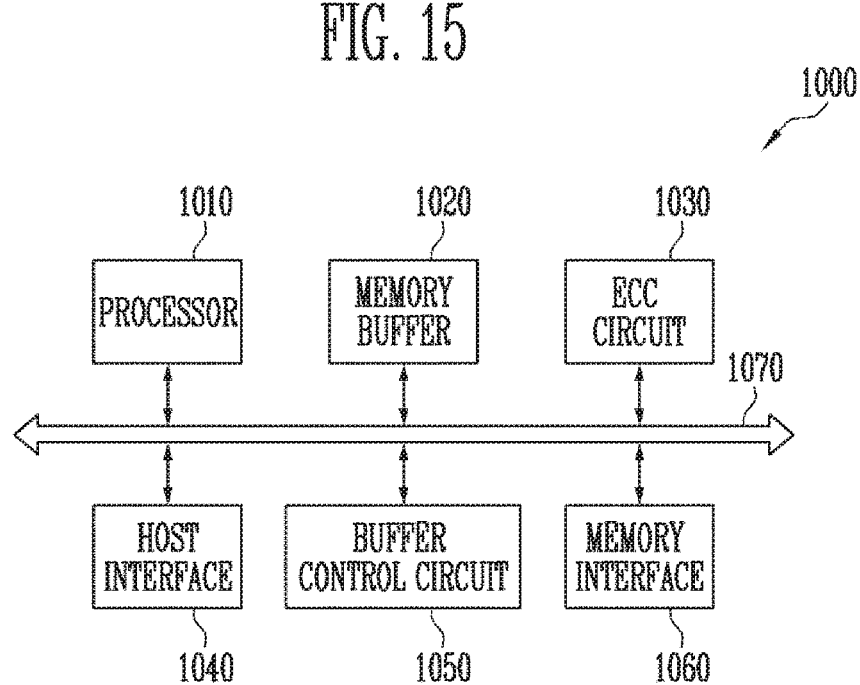
FIG. 15 is a diagram illustrating an embodiment of the memory controller 200 of FIG. 1.

FIG. 15 is a diagram illustrating an embodiment of the memory controller 200 of FIG. 1.

The memory controller 1000 is coupled to a host and the memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

Referring to FIG. 15, the memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation.

The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer circuit 1020 may be used as an operating memory, a cache memory, or a buffer memory of the processor 1010. The memory buffer circuit 1020 may store codes and commands to be executed by the processor 1010. The memory buffer circuit 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device 100 through the memory interface 1060. The ECC circuit 1030 may perform an ECC decoding operation on data received from the memory device 100 through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device 100 through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 16:
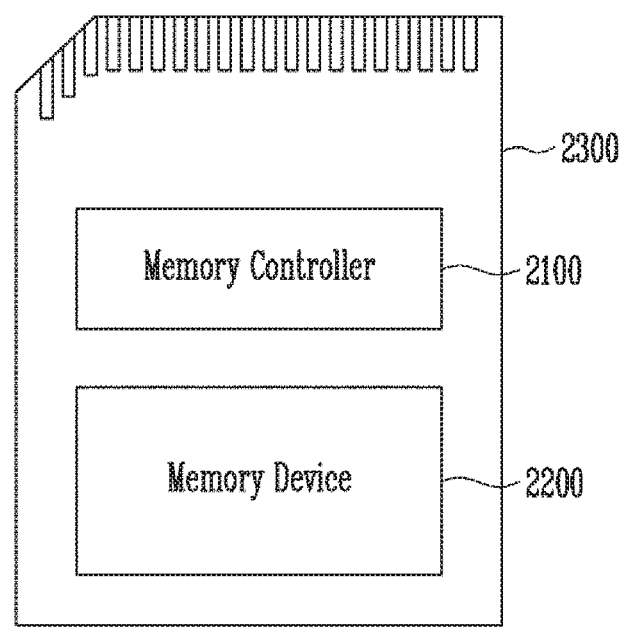
FIG. 16 is a block diagram illustrating a memory card system to which the storage device in accordance with an embodiment of the present disclosure is applied.

FIG. 16 is a block diagram illustrating a memory card system 2000 to which the storage device in accordance with an embodiment of the present disclosure is applied.

Referring FIG. 16, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processing unit, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 17:
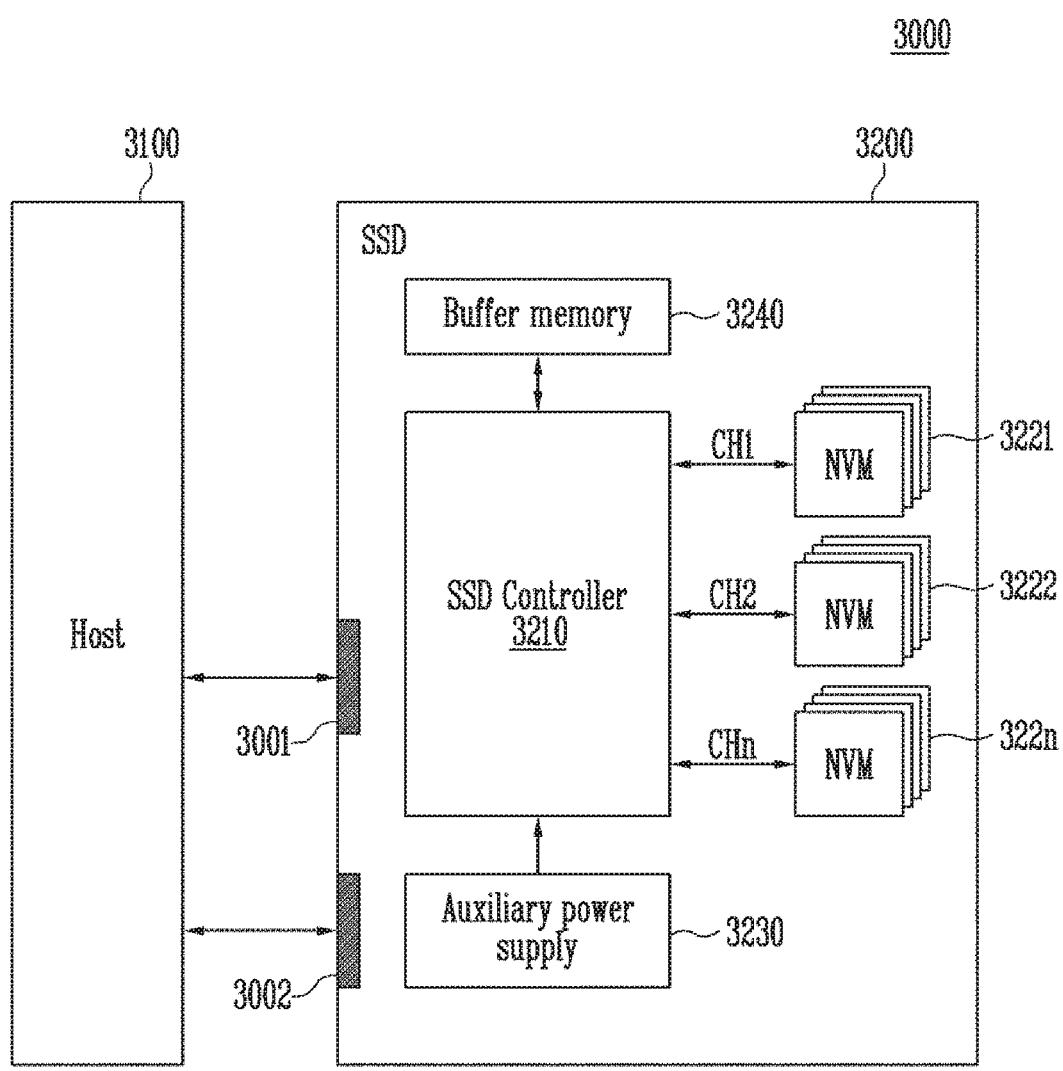
FIG. 17 is a block diagram illustrating a solid state drive (SSD) system to which the storage device in accordance with an embodiment of the present disclosure is applied.

FIG. 17 is a block diagram illustrating a solid state drive (SSD) system 3000 to which the storage device in accordance with an embodiment of the present disclosure is applied.

Referring to FIG. 17, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322$n$, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322$n$ in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322$n$ or may temporarily store metadata (e.g., mapping tables) of the flash memories 3221 to 322$n$. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 18:
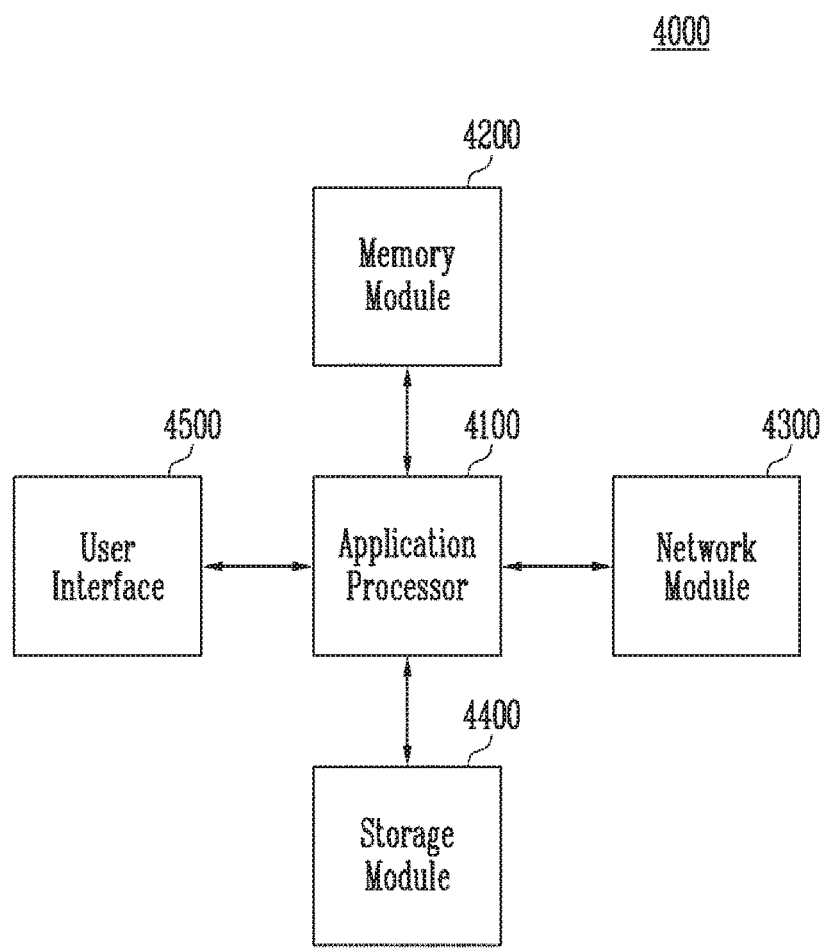
FIG. 18 is a block diagram illustrating a user system to which the storage device in accordance with an embodiment of the present disclosure is applied.

FIG. 18 is a block diagram illustrating a user system 4000 to which the storage device in accordance with an embodiment of the present disclosure is applied.

Referring to FIG. 18, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 400.

In an embodiment, the storage module 4400 may include a plurality of nonvolatile memory devices, and each of the plurality of nonvolatile memory devices may be operated in the same manner as that of the memory device 100, described above with reference to FIGS. 10 and 14. The storage module 4400 may be operated in the same manner as that of the storage device 50, described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a motor.

Various embodiments of the present disclosure may provide a storage device including a read cache memory block and a method of operating the storage device.

In accordance with the present disclosure, data that has a high read frequency and cannot be read in a data interleaving manner because the data is stored in the same memory device may be spread and stored to a read cache data block so that the data having a high read frequency may be more rapidly read.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not always be sequentially performed in given order, and may be randomly performed. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A storage device comprising:
a plurality of memory devices each including one or more read cache memory blocks and a plurality of main memory blocks; and
a memory controller configured to store read counts for logical block addresses corresponding to data stored in the plurality of main memory blocks and to distribute cache data stored in one memory device among the plurality of memory devices to the one or more read cache memory blocks included in the plurality of memory devices based on read counts for logical block addresses corresponding to the cache data,
wherein the read counts for the logical block addresses corresponding to the cache data exceed a threshold value, respectively.

2. The storage device according to claim 1, wherein the one or more read cache memory blocks are programmed as single-level cells, each of which stores a single data bit.

3. The storage device according to claim 1, wherein the plurality of main memory blocks are programmed as multi-level cells, each of which stores at least two data bits.

4. The storage device according to claim 1, wherein the memory controller comprises:

an operation control unit configured to control the plurality of memory devices in response to a read request input from an external host; and a read cache block control unit configured to determine, based on the read counts of the logical block addresses of the data stored in the plurality of main memory blocks, the cache data corresponding to at least two or more logical block addresses of the logical block addresses.

5. The storage device according to claim 4, wherein the read cache block control unit comprises:

a cache data information storage unit configured to store the read counts of the logical block addresses of the data stored in the plurality of main memory blocks, and cache data information including physical block addresses corresponding to the respective logical block addresses of the data stored in the plurality of main memory blocks; and a cache data management unit configured to determine the cache data based on the cache data information.

6. The storage device according to claim 5, wherein the cache data management unit detects, based on the cache data information, at least two or more logical block addresses, the read count of each of which exceeds the threshold value, among the logical block addresses of the data stored in the plurality of main memory blocks.

7. The storage device according to claim 6, wherein the cache data management unit determines data stored in the one memory device of the plurality of memory devices among data corresponding to the at least two or more logical block addresses, as the cache data.

8. The storage device according to claim 7, wherein the cache data management unit provides physical block addresses for the cache data to the operation control unit.

9. The storage device according to claim 8, wherein the operation control unit reads the cache data from the one memory device among the plurality of memory devices and stores the cache data to the one or more read cache memory blocks to be read in an interleaving manner.

10. A method for operating a storage device including a plurality of memory devices coupled to one of channels and each including one or more read cache memory blocks and a plurality of main memory blocks, and a memory controller configured to control the plurality of memory devices, the method comprising:

storing read counts for logical block addresses corresponding to data stored in the plurality of main memory blocks; and distributing cache data stored in one memory device among the plurality of memory devices to the one or more read cache memory blocks included in the plurality of memory devices based on read counts for logical block addresses corresponding to the cache data, wherein the read counts for the logical block addresses corresponding to the cache data exceed a threshold value, respectively.

11. The method according to claim 10, wherein the distributing comprises:

comparing the read counts for the logical block addresses of the data stored in the plurality of main memory blocks with the threshold value; and detecting at least two or more logical block addresses, the read count of each of which exceeds the threshold value.

12. The method according to claim 11, wherein the distributing comprises:

determining data stored in the one memory device among data corresponding to the at least two or more logical block addresses, as the cache data; and copying the cache data to the one or more read cache memory blocks included in each of the plurality of memory devices.

13. The method according to claim 12, wherein the copying comprises:

detecting physical block addresses for the cache data; and performing a read operation on the physical block addresses, and programming read data to the one or more read cache memory blocks included in each of the plurality of memory devices.

14. The method according to claim 10, wherein the one or more read cache memory blocks are programmed as single-level cells, each of which stores a single data bit.

15. The method according to claim 10, wherein the plurality of main memory blocks are programmed as multi-level cells, each of which stores at least two data bits.

* * * * *